(12) United States Patent
Schaap et al.

(10) Patent No.: US 7,377,713 B2
(45) Date of Patent: May 27, 2008

(54) FRONT-WHEEL SUPPORT FOR A WHEEL CHAIR

(75) Inventors: Robertus H. P. F. Schaap, Binningen (CH); Florian Kaufmann, Sissach (CH); Rainer Kueschall, Sissach (CH)

(73) Assignee: Kuschall AG, Allschwil (CH)

( * ) Notice: Subject to any disclaimer, the term of this patent is extended or adjusted under 35 U.S.C. 154(b) by 477 days.

(21) Appl. No.: 10/791,699

(22) Filed: Mar. 4, 2004

(65) Prior Publication Data

US 2004/0172786 A1    Sep. 9, 2004

(30) Foreign Application Priority Data

Mar. 4, 2003    (EP)    ................... 03004757

(51) Int. Cl.
*B60B 33/04*    (2006.01)
*B65B 1/00*    (2006.01)

(52) U.S. Cl. ................ 403/109.8; 16/31 R; 16/19; 16/31 A; 403/109.5; 403/109.1; 280/43

(58) Field of Classification Search ............. 16/31 R, 16/31 A, 40, 39, 42 T, 43, 18 A, 18 R; 280/657, 280/658, 47.38, 43; 403/205, 109.1–109.8; 108/147, 177, 189

See application file for complete search history.

(56) References Cited

U.S. PATENT DOCUMENTS

| | | | | | |
|---|---|---|---|---|---|
| 102,927 | A | * | 5/1870 | Elder .................... 280/47.38 |
| 292,873 | A | * | 2/1884 | Chen ......................... 83/34 |
| 554,381 | A | * | 2/1896 | Staley ................... 126/304 R |
| 1,482,955 | A | | 2/1924 | Tideman | |
| 1,835,144 | A | | 12/1931 | Cleaveland | |
| 2,534,539 | A | * | 12/1950 | Topper .................... 280/7.1 |
| 2,649,611 | A | * | 8/1953 | Muszynski ................ 16/30 |
| 4,229,856 | A | * | 10/1980 | Sparkes .................... 16/47 |
| 4,265,382 | A | * | 5/1981 | Edwards .................. 224/320 |
| 4,357,735 | A | * | 11/1982 | Saint et al. ............... 16/224 |
| 4,386,466 | A | * | 6/1983 | Lee .......................... 33/515 |
| 4,813,693 | A | * | 3/1989 | Lockard et al. ............ 280/42 |
| 5,149,092 | A | * | 9/1992 | Parsons ................. 463/47.7 |
| 5,195,712 | A | * | 3/1993 | Goodall ................... 248/430 |
| 5,267,946 | A | * | 12/1993 | Singer et al. ............. 602/16 |
| 5,361,454 | A | * | 11/1994 | Sumser et al. ............ 16/20 |
| 5,373,591 | A | * | 12/1994 | Myers .................... 4/560.1 |
| 5,800,318 | A | * | 9/1998 | Coviello ................. 482/68 |
| 5,806,548 | A | * | 9/1998 | Goldstein et al. ........ 135/65 |
| 5,918,553 | A | * | 7/1999 | Hellwig et al. ....... 108/147.19 |
| 6,076,205 | A | * | 6/2000 | Yang ....................... 5/99.1 |
| 6,085,766 | A | * | 7/2000 | Geary ..................... 135/75 |

(Continued)

FOREIGN PATENT DOCUMENTS

DE    39 04 150 C1    7/1990

(Continued)

*Primary Examiner*—Katherine Mitchell
(74) *Attorney, Agent, or Firm*—Browdy and Neimark P.L.L.C

(57) ABSTRACT

A front wheel support for a wheel chair, the front wheel support having a curved tube for attachment to a frame member of the wheel chair and a curved part. The curved part has a first portion with a curvature identical to the curvature of the curved tube, and a cross section allowing the first portion of the curved part to fit inside the curved tube. The curved part further has a second portion with a wheel fork seat for mounting a front wheel fork of the wheel chair.

12 Claims, 6 Drawing Sheets

U.S. PATENT DOCUMENTS

| | | | |
|---|---|---|---|
| 6,189,906 B1 * | 2/2001 | Horacek | 280/250.1 |
| 6,196,571 B1 * | 3/2001 | Chen et al. | 280/647 |
| 2002/0017404 A1 * | 2/2002 | Choi et al. | 180/65.1 |
| 2002/0140196 A1 * | 10/2002 | Crouch et al. | 280/87.051 |
| 2006/0113733 A1 * | 6/2006 | Kazaoka | 280/5.24 |

FOREIGN PATENT DOCUMENTS

| | | |
|---|---|---|
| DE | 299 01 471 U1 | 7/1999 |
| GB | 1 053 263 A | 12/1966 |

* cited by examiner

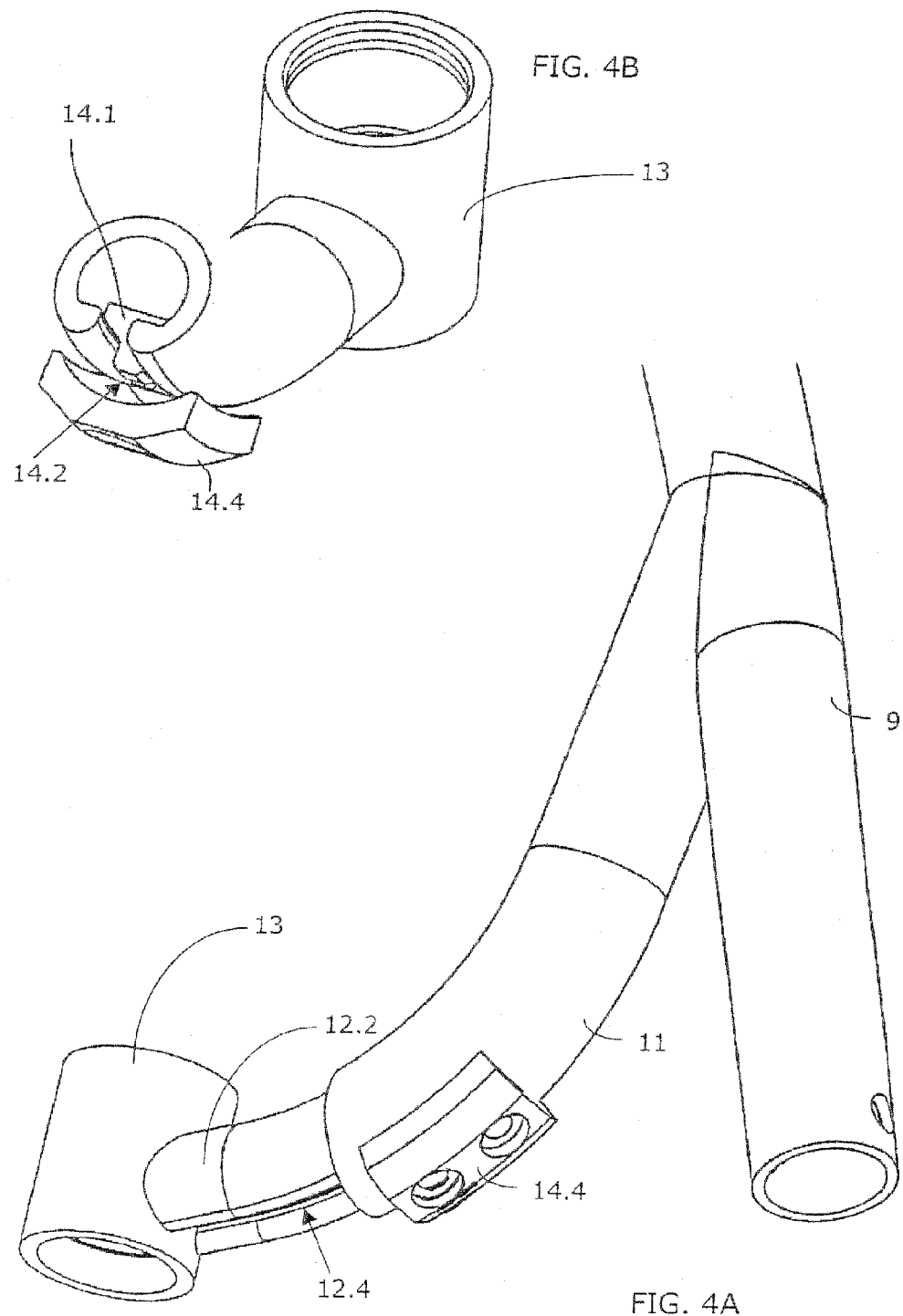

FRONT-WHEEL SUPPORT FOR A WHEEL CHAIR

CROSS REFERENCE TO RELATED APPLICATIONS

This application claims priority of European Patent Application No. EP 03 004 757.5, filed 4 Mar. 2003, incorporated herein by reference.

BACKGROUND OF THE INVENTION

1. Technical Field

The present invention relates to a frontwheel support for a wheel chair.

2. Prior Art

Wheel chairs typically have one or two front wheels. These front wheels are fixed to the frame of the wheel chair by means of a front wheel support. The front wheel support is usually designed to be operated in a upright position where the front wheel fork turns about an axis that is essentially vertical with respect to the ground.

When changing the geometry of the whole wheel chair, e.g. when adjusting the seat heights and inclination, the frame of the wheel chair is tilted with respect to the ground. This leads to a situation where the front wheel support is not longer in an correct upright position. Due to this, the front wheel cannot move and turn as freely as intended. This means that after having modified the wheel chair's geometry, one usually has to adjust the front wheel support to bring the axis in an upright position.

Known wheel chairs require for such an adjustment several screws to be loosened, the support to be adjusted and the screws to be tightened again. Other solutions require special tools. Since the adjustment of known wheel chairs is complicated, authorized dealers or specialists are required to perform this task.

OBJECT AND SUMMARY OF THE INVENTION

It is an objective of the present invention to provide a front wheel support that can more easily be adjusted.

It is another objective of the present invention to provide a front wheel support that is stable and light weight.

BRIEF DESCRIPTION OF THE DRAWINGS

The invention will now be described in detail and with the help of the drawings.

FIG. 4A schematically shows a second front wheel support of a wheel chair in accordance with the invention;

FIG. 4B schematically shows a partial view of the second front wheel support of a wheel chair in accordance with the invention.

DESCRIPTION OF THE PREFERRED EMBODIMENTS

Figure 1A:
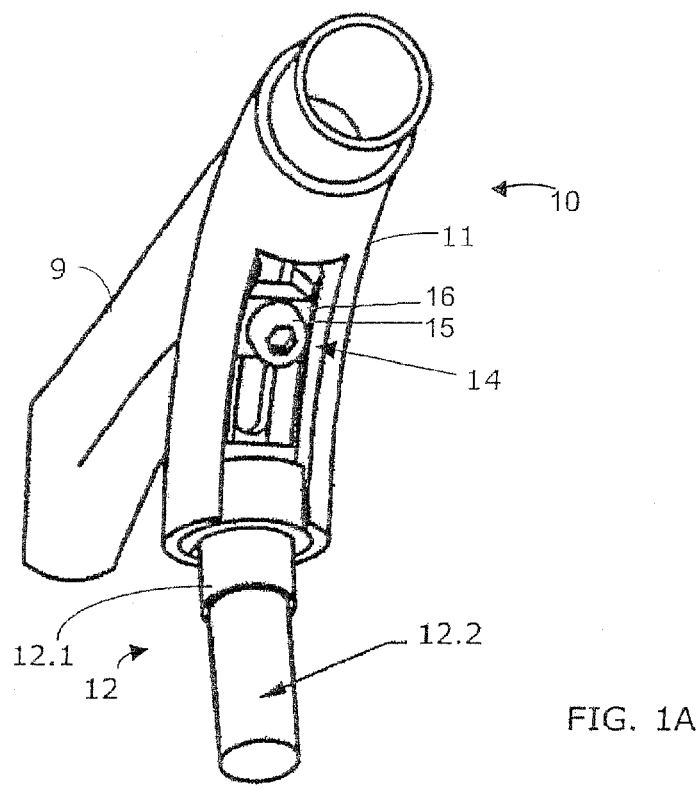
FIG. 1A schematically shows a first front wheel support of a wheel chair in accordance with the invention.
Figure 1B:
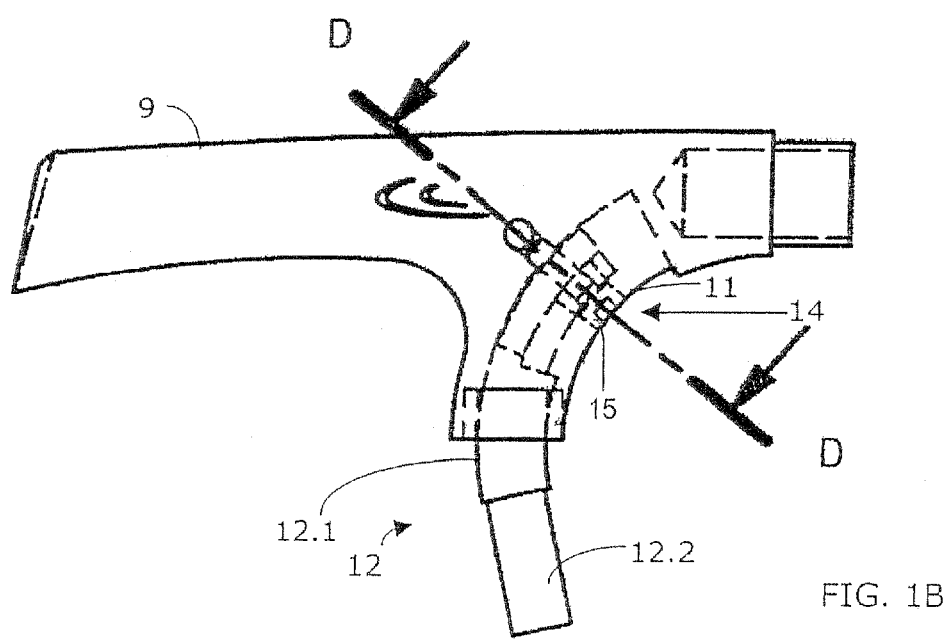
FIG. 1B schematically shows a side view of the first front wheel support of a wheel chair in accordance with the invention.
Figure 1C:
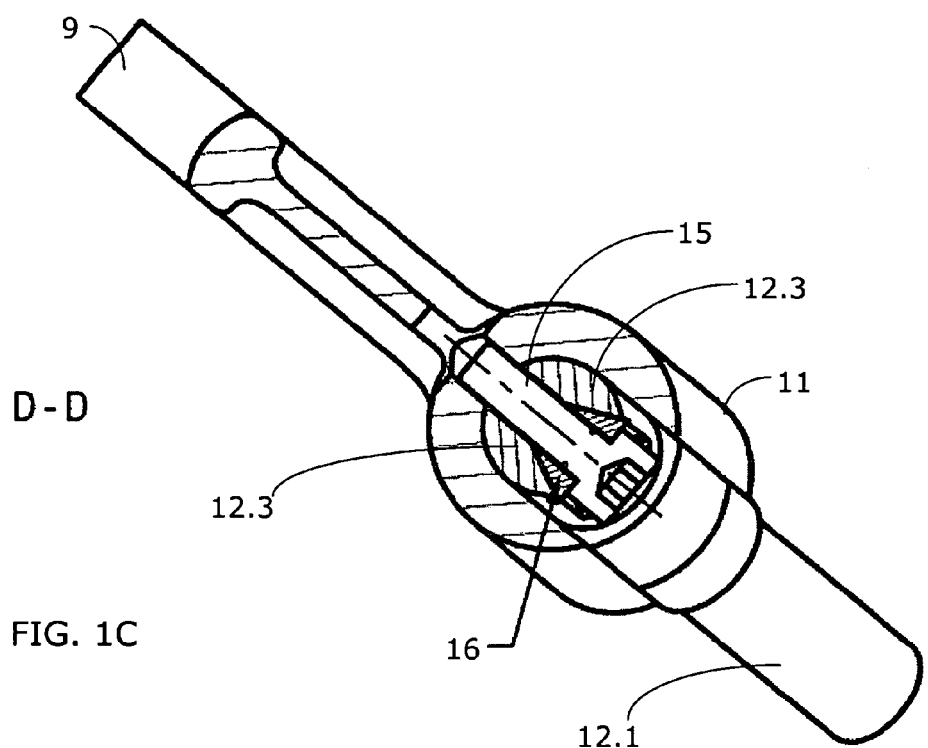
FIG. 1C schematically shows a top view of the first front wheel support of a wheel chair in accordance with the invention.

A first embodiment, according to the present invention, is depicted in FIGS. 1A 1B, and 1C. The front wheel support 10 for a wheel chair is depicted. Only part of a frame member 9 of the wheel chair is visible. The front wheel support 10 comprises a first curved part in form of a curved tube 11 being attached to the frame member 9 of the wheel chair. In the present embodiment, the first curved tube 11 is attached to the frame member 9 by means of welding. The first curved tube 11 may also be an integral part of the frame member 9. A second curved part 12, which may be a tube part or a massive part, is provided. The curved tube 11 and the curved part 12 can be bended in the direction as depicted or in another direction.

This second curved part 12 has a first portion 12.1 with a curvature being identical to the curvature of the first curved tube 11. Furthermore, the first portion 12.1 has a cross section A1 allowing the first portion 12.1 to fit inside the first curved tube 11, as illustrated in FIG. 1B. The second curved part 12 comprises a second portion 12.2 with a wheel fork seat for mounting a front wheel fork of said wheel chair. The front wheel fork and the front wheel are not visible in FIGS. 1A, 1B, and 1C.

It is important for the front wheel support 10 to be very stable. This requires the second curved part 12 to form a tight fit inside the first curved tube 11. This tight fit needs to be releasable in order to allow the front wheel support 10 to be adjusted. According to the present invention, a special securing arrangement 14 is provided. The front wheel support 10 illustrated in the FIGS. 1A, 1B, and 1C comprises a section that can be extended or expanded when being situated inside the first curved tube 11 in order to form a tight fit with respect to the second curved part 12. For this reason, the first portion 12.1 has a fork-like shape with two ends 12.3. These two ends 12.3 are spaced apart so that a screw 15 together with a conical element 16 fits between the two ends 12.3, as illustrated in FIG. 1C. When turning the screw 15, the conical element 16 is pushed between the two ends 12.3 of the first portion 12.1. Due to this, the two ends 12.3 are expanded and pushed against the inner wall of the first curved tube 11. The load path is provided between the first portion 12.1 of the second curved part 12 and the first curved tube 11 if the screw 15 is in the right position. The securing arrangement 14 can be released by turning the screw 15 in the opposite direction. The two ends 12.3 will return to their original position since the conical part withdraws.

Figure 2:
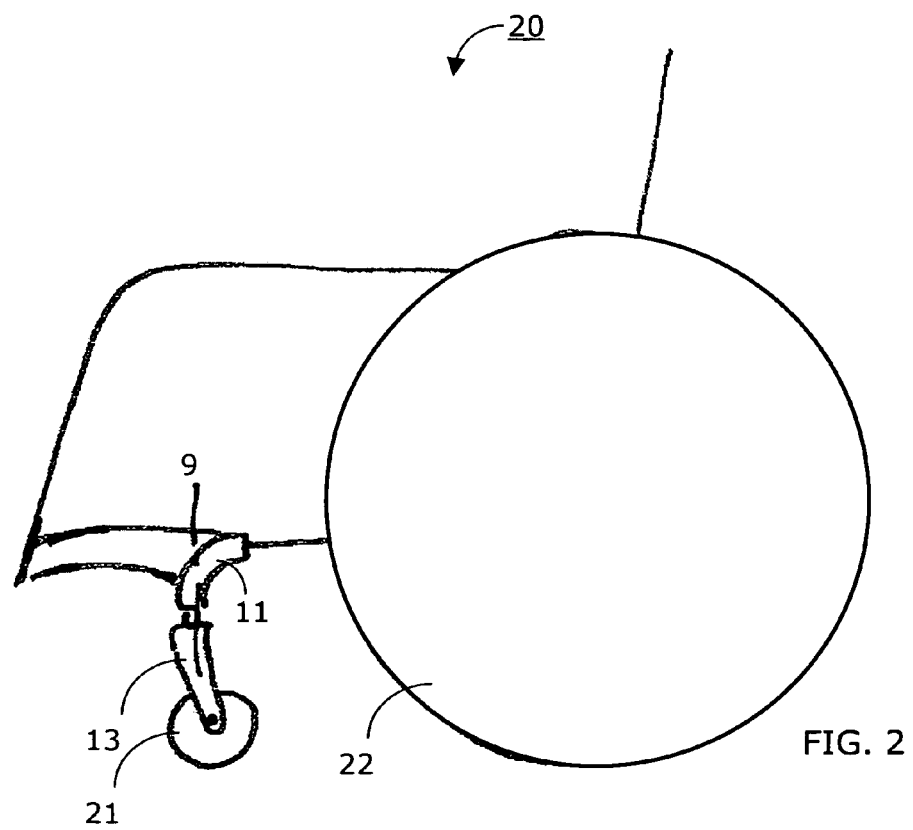
FIG. 2 schematically shows a side view of a wheel chair in accordance with the invention.

A schematic representation of a wheel chair 20 is given in FIG. 2. The wheel chair 20 comprises at least one front wheel support 10, according to the present invention. This front wheel support 16. The front wheel support 10 comprises a first curved tube 11 being attached to the frame member 9 of the wheel chair. In the present embodiment, the first curved tube 11 is attached to the frame member 9. The first curved tube 11 may be an integral part of the frame member 9, as illustrated in FIG. 2. A second curved part 12 is provided.

This second curved part 12 has a first portion 12.1 with a curvature being identical to the curvature of the first curved tube 11. The second curved part 12 comprises a second portion with a wheel fork 13 for mounting a front wheel 22 of said wheel chair 20. The wheel chair 20 further comprises a rear wheel 22.

Figure 3A:
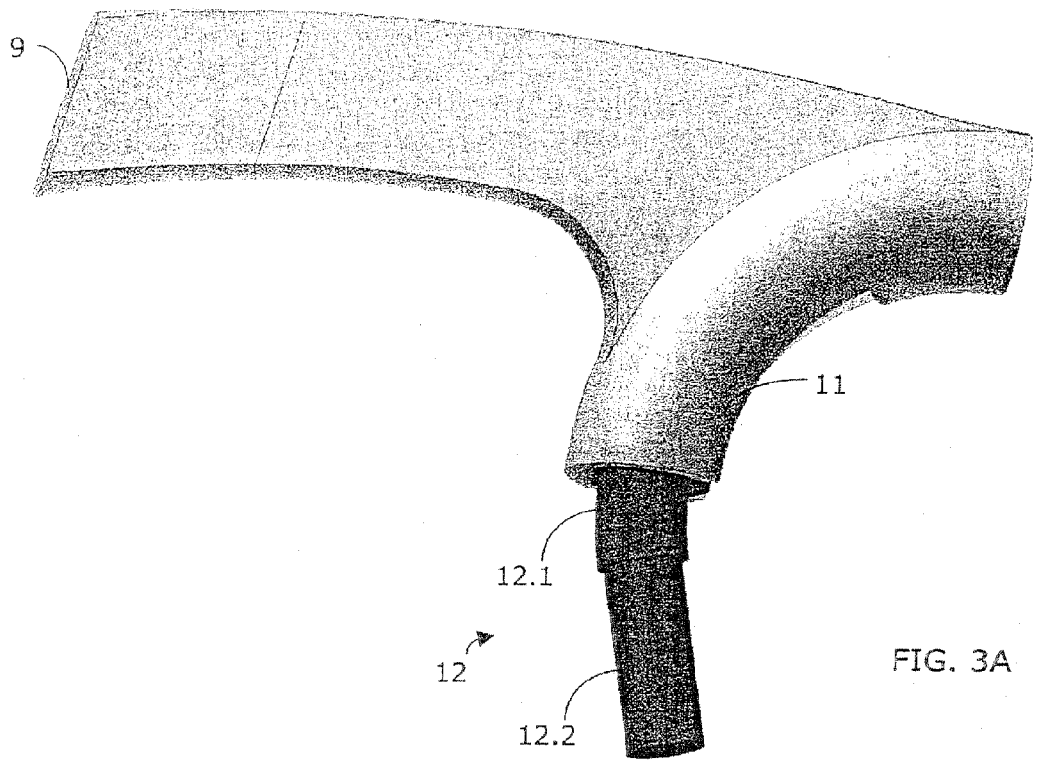
FIG. 3A schematically shows a side view of the first front wheel support of a wheel chair in accordance with the invention.
Figure 3B:
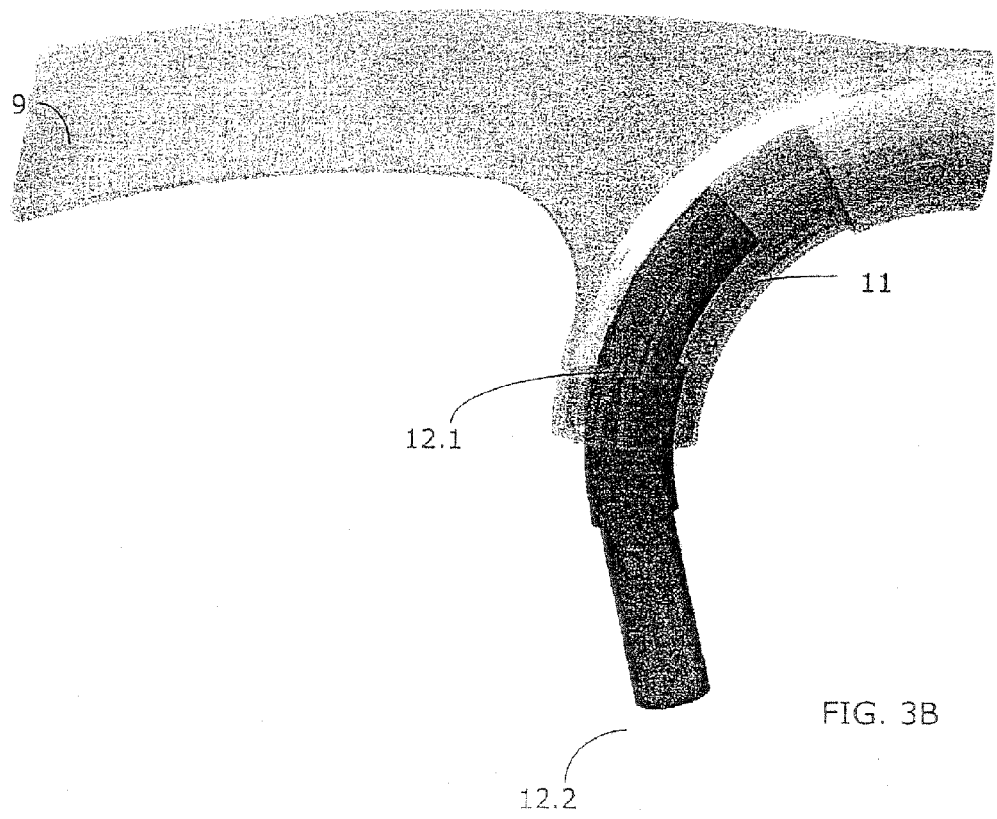
FIG. 3B schematically shows a side view of the first front wheel support of a wheel chair in accordance with the invention.
Figure 3C:
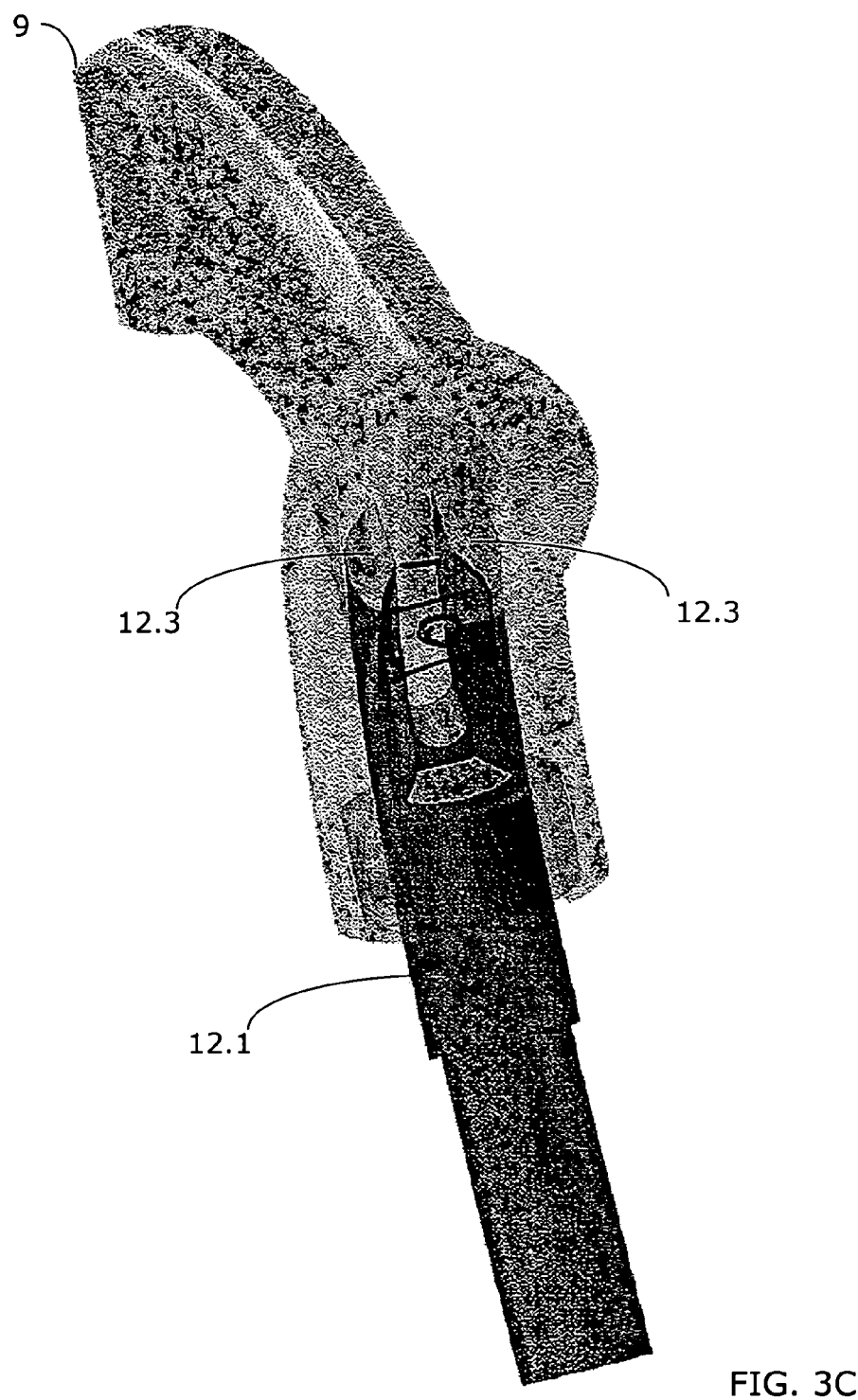
FIG. 3C schematically shows a front view of the first front wheel support of a wheel chair in accordance with the invention.
Figure 5:
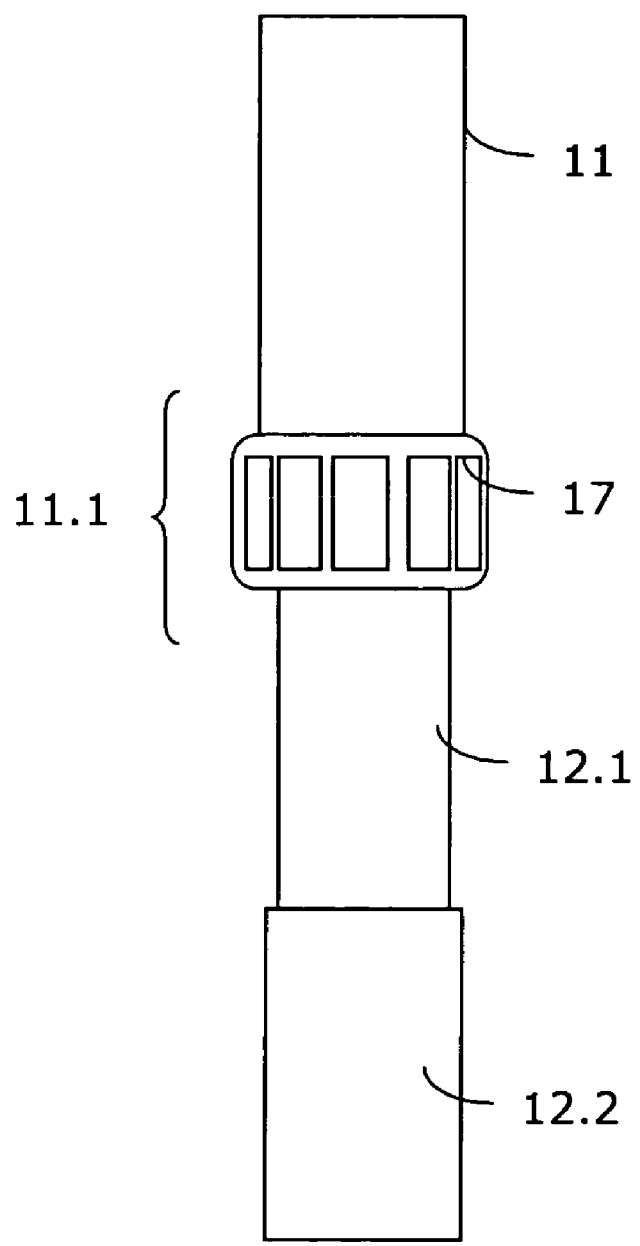
FIG. 5 schematically shows a third front wheel support of a wheel chair in accordance with the invention.

Further details of the embodiment of FIGS. 1A through 1C are depicted in FIGS. 3A through 3C. According to the present invention, a special securing arrangement 14 is provided. The front wheel support 10 illustrated in the FIGS. 3A, 3B, and 3C comprises a section that can be extended or expanded when being situated inside the first curved tube 11 in order to form a tight fit with respect to the second curved part 12. For this reason, the first portion 12.1 has a fork-like shape with two ends 12.3. These two ends 12.3 are spaced apart so that a screw 15 together with a conical element 16 fits between the two ends 12.3, as illustrated in FIG. 3C. When turning the screw 15, the conical part 16 is pushed between the two ends 12.3 of the first portion 12.1. Due to this, the two ends 12.3 are pushed against the inner wall of the first curved tube 11. The load path is provided between the first portion 12.1 of the second curved part 12 and the first curved tube 11 if the screw 15 (not visible in any of the FIGS. 3A through 3C) is in the right position. The securing arrangement 14 can be released by turning the screw 15 in the opposite direction. The two ends 12.3 will return to their original position since the conical part 16 withdraws.

Yet another embodiment is depicted in FIGS. 4A and 4B. The first curved tube 11 is attached to the frame 9. According to this embodiment, the second curved part 12 comprises a longitudinal slit 12.4. The securing arrangement 14 comprises a sliding element 14.1 with a threaded hole 14.2 and a screw. This screw is not visible in the FIGS. 4A and 4B. The screw sits in a mounting piece 14.4 that is attached to the outside of the first curved tube 11. The screw is inserted through a hole 14.5 in the mounting piece 14.4 in sits in the threaded hole 14.2 of the sliding element 14.1 and the screw is accessible from outside through the longitudinal slit 12.4. The sliding element 14.1 moves together with the first portion 12.1 inside the first curved tube 11 up or down, if the second curved part 12 is pushed into or pulled out of the first curved tube 11. When the correct position of the front wheel support is reached, the screw is tightened. Due to this, the sliding element 14.1 together with the second curved part 12 is fixed with respect to the first curved tube 11 and the mounting piece 14.4.

FIGS. 4A and 4B also show that the second curved part 12 comprises a second portion 12.2 with a wheel fork seat 13 for mounting a front wheel fork of said wheel chair.

According to another embodiment, the first curved tube 11 comprises a securing arrangement 14 with a nut 17. This nut 17 sits on the end portion 11.1 of the first curved tube 11. The end portion of the first curved tube 11 is threaded allowing the nut 17 to be fixed or released by turning it. Inside the first curved tube 11 there is a conical part. This conical part sits on the first portion 12.1 of the second curved part 12. When fixing the nut 17, the conical part provides for a tight fight between the end portion 11.1 of the first curved tube 11 and the first portion 12.1 of the second curved part 12. The principle is similar to the one being used in connection with garden hoses or pipes where one cylindrical piece is to be tightly connected to another cylindrical piece in the same manner. The difference, however, is in the dimensions and materials used. Since the front wheel support 10 has to be stable, a more solid and rigid version is required.

The invention claimed is:

1. Front wheel support for a wheel chair, said front wheel support comprising:
    a longitudinally curved tube for being attached to a frame member of the wheel chair and
    a longitudinally curved part, said curved part having
        a first portion with
            a curvature being identical to the curvature of the curved tube, and
            a cross section allowing the first portion of the curved part to fit inside the curved tube, and
        a second portion with a wheel seat for mounting a front wheel fork of said wheel chair;
    wherein the first portion of the curved part is telescopically shiftable inside the curved tube to provide for an increased or decreased overlap between the first portion of the curved part and the curved tube, and
    wherein a securing arrangement is provided between the first portion and the curved tube that allows the curved tube to be fixed with respect to the curved part, said securing arrangement comprising a screw and a conical part both of which set inside the curved tube.

2. The front wheel support of claim 1, wherein due to the curvature the inclination of the front wheel (22) is adjustable by increasing or decreasing the overlap.

3. The front wheel support of claim 1, wherein a load path is provided between the first portion of the curved part and the curved tube.

4. The front wheel support of claim 1, wherein the first portion of the curved part comprises a section which is expandable to form a tight fit with respect to the curved tube.

5. The front wheel support of claim 4, wherein the section can be expanded when the screw is turned to push the conical part to expand the section against the curved tube.

6. Wheel chair comprising at least one front-wheel support of one of claims 2, 3, 4, 5 or 1.

7. Front wheel support for a wheel chair, said front wheel support comprising:
    a tube formed in a first arc along a length thereof for engagement to a frame member of the wheel chair and
    a part formed in a second arc along a length thereof, said part having,
    a first portion wherein the longitudinal curvature of the second arc is identical to the longitudinal curvature of the first arc of the tube,
        a cross section allowing the first portion of the part to fit inside the tube, and
        a second portion with a wheel seat for mounting a front wheel fork of said wheel chair,
    wherein the first portion of the part is telescopically shiftable inside the tube to provide an increased or decreased overlap between the first portion of the part and the tube, and
    wherein the first portion of the part has the cross section of the first portion of the part which is expandable to form a tight fit with respect to the tube.

8. The front wheel support of claim 7, wherein the inclination of the front wheel is adjustable by the increasing or decreasing of the overlap.

9. The front wheel support of claim 7, wherein a load path is provided between the first portion of the part and the tube.

10. The front wheel support of claim 7, wherein a securing arrangement is provided between the expandable section and the tube that allows the tube to be fixed with respect to the part, said securing arrangement having a screw and a conical part both of which sit inside the curved tube.

11. The front wheel support of claim 10, wherein the section can be expanded when the screw if turned to push the conical part to expand the section against the tube.

12. The front wheel support of claim 7, wherein the section has two opposing ends which are expandable against the tube.

* * * * *